US012730574B2

(12) United States Patent
Bao et al.

(10) Patent No.: US 12,730,574 B2
(45) Date of Patent: Sep. 8, 2026

(54) METHOD AND SYSTEM FOR REMOTE MEMORY ACCESS USING DATA PROCESSING UNITS

(71) Applicant: HUAWEI TECHNOLOGIES CO., LTD., Shenzhen (CN)

(72) Inventors: Xiaoming Bao, Beijing (CN); Hua Xu, Hangzhou (CN); Chun Liu, Hangzhou (CN); Minjun Zhou, Hangzhou (CN); Jiahuai Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/990,923

(22) Filed: Dec. 20, 2024

(65) Prior Publication Data

US 2025/0117145 A1 Apr. 10, 2025

Related U.S. Application Data

(63) Continuation of application No. PCT/CN2023/101605, filed on Jun. 21, 2023.

(30) Foreign Application Priority Data

Jun. 25, 2022 (CN) ......................... 202210731856.0
Aug. 16, 2022 (CN) ......................... 202210981958.8

(51) Int. Cl.
*G06F 3/06* (2006.01)

(52) U.S. Cl.
CPC .......... *G06F 3/0638* (2013.01); *G06F 3/0604* (2013.01); *G06F 3/0662* (2013.01); *G06F 3/067* (2013.01)

(58) Field of Classification Search
CPC ........ G06F 3/06; G06F 3/0604; G06F 3/0638; G06F 3/061; G06F 3/0626; G06F 3/0631;
(Continued)

(56) References Cited

U.S. PATENT DOCUMENTS

2015/0356020 A1 12/2015 Desai et al.
2017/0285940 A1 10/2017 Benisty et al.
(Continued)

FOREIGN PATENT DOCUMENTS

CN 114117484 A 3/2022
CN 118277305 A * 12/2022

OTHER PUBLICATIONS

Yang et al., “FileMR: Rethinking RDMA Networking for Scalable Persistent Memory,” Paper, Presented at Proceedings of the 17th USENIX Symposium on Networked Systems Design and Implementation (NSDI ’20), Feb. 25-27, 2020, 16 pages.
(Continued)

*Primary Examiner* — Tracy C Chan
(74) *Attorney, Agent, or Firm* — Fish & Richardson P.C.

(57) ABSTRACT

This disclosure provides data processing methods, apparatuses, and systems. In an implementation, a method comprises receiving, by a first data processing unit (DPU), a memory allocation request from a first service process in a computing node that comprises the first DPU, wherein the first DPU stores memory address assignment information that indicates a virtual memory address corresponding to a physical memory allocated by a storage node to the computing node. Determining, by the first DPU based on the memory address assignment information and in the virtual memory address corresponding to the physical memory allocated by the storage node to the computing node, a virtual memory address range assigned to the first service process, and when the first DPU receives a data storage request from the first service process, sending, by the first DPU, a write data request to the second DPU over a communication link between the first DPU and the second DPU.

17 Claims, 9 Drawing Sheets

(58) Field of Classification Search
CPC ...... G06F 3/0635; G06F 3/064; G06F 3/0643; G06F 3/065; G06F 3/0656; G06F 3/0659; G06F 3/067; G06F 9/5066; G06F 12/0686; G06F 12/109; G06F 2212/311
See application file for complete search history.

(56) References Cited

U.S. PATENT DOCUMENTS

| | | | | |
|---|---|---|---|---|
| 2019/0034281 | A1* | 1/2019 | Dubeyko | G06F 11/0724 |
| 2022/0057954 | A1* | 2/2022 | Cui | G06F 3/0649 |
| 2022/0156287 | A1 | 5/2022 | Zhang et al. | |
| 2022/0283975 | A1* | 9/2022 | Meyer | G06F 12/0292 |

OTHER PUBLICATIONS

Extended European Search Report in European Appln. No. 23826488.1, mailed on Jun. 26, 2025, 14 pages.

* cited by examiner

METHOD AND SYSTEM FOR REMOTE MEMORY ACCESS USING DATA PROCESSING UNITS

CROSS-REFERENCE TO RELATED APPLICATIONS

This application is a continuation of International Application No. PCT/CN2023/101605, filed on Jun. 21, 2023, which claims priority to Chinese Patent Application No. 202210981958.8, filed on Aug. 16, 2022, and Chinese Patent Application No. 202210731856.0, filed on Jun. 25, 2022, all of which are hereby incorporated by reference in their entireties.

TECHNICAL FIELD

This application relates to the field of computer technologies, and in particular, to a data processing method, apparatus, and system.

BACKGROUND

A MapReduce (MR) model is a distributed big data processing model used for parallel computing of large-scale data sets. In MapReduce, a job is divided into tasks to run the job. The tasks include a map task and a reduce task. In a distributed mode, data is distributed on different nodes. Therefore, after the data on the different nodes is processed by the map task, temporary data is written into a local disk, and then, a node on which the reduce task is located remotely reads the data to the local, to complete data processing. The data exchange process is referred to as shuffle.

In the trend of separation and cloudification of big data storage and computing, a remote shuffle architecture is proposed in the industry to reduce hardware costs and improve resource utilization. The remote shuffle architecture includes a computing node and a remote shuffle service (RSS) node. In the remote shuffle architecture, disks are uniformly deployed on the RSS node, and the RSS node provides a storage service. The computing node stores the temporary data generated during shuffle in a local disk of the RSS node. During specific implementation, an MR process is run on the computing node. Data transmission is performed between the MR process and an RSS process on the RSS node over a transmission control protocol (TCP) link or by using a remote direct memory access (RDMA) queue pair (QP) (which are collectively referred to as a communication link), and the RSS process interacts with the local disk deployed on the RSS node, to complete shuffle read and/or shuffle write. The MR process is a service process. The computing node runs an MR process, which indicates that the computing node executes a map task or a reduce task.

In a big data processing scenario, one computing node may simultaneously execute a plurality of map tasks and/or reduce tasks, in other words, the computing node may simultaneously run a plurality of MR processes. Because each MR process needs to establish a communication link to the RSS process, there are a large quantity of communication links between the computing node and the RSS node, and an excessive quantity of links may cause sharp deterioration of data transmission performance, thereby affecting data processing efficiency.

SUMMARY

This application provides a data processing method, apparatus, and system, to improve data processing efficiency in a remote shuffle architecture.

According to a first aspect, a data processing method is provided, and is applied to a computing node. The computing node includes a first data processing unit (DPU). A communication link is established between the first DPU and a second DPU in a storage node. The first DPU stores memory address assignment information. The memory address assignment information indicates a virtual memory address corresponding to a physical memory allocated by the storage node to the computing node. The method includes: The first DPU receives a memory allocation request from a first service process in the computing node. The first DPU determines, based on the memory address assignment information and in the virtual memory address corresponding to the physical memory allocated by the storage node to the computing node, a virtual memory address range assigned to the first service process. When the first DPU receives a data storage request from the first service process, the first DPU sends a write data request to the second DPU over the communication link. The data storage request includes first data and a first memory address. The first memory address belongs to the virtual memory address range. The write data request includes the first data and the first memory address. The write data request is used for requesting the second DPU to write the first data into the physical memory corresponding to the first memory address.

In this application, a DPU is separately deployed on the computing node and the storage node, and a communication link is established between the DPU in the computing node and the DPU in the storage node. The DPU in the storage node synchronizes the memory address assignment information to the DPU in the computing node over the communication link, to enable the DPU in the computing node to pre-store the virtual memory address corresponding to the physical memory allocated by the storage node to the computing node. In this way, the computing node may implement remote direct memory mapping via the DPU, to implement direct access to the physical memory of the storage node. During specific implementation, the DPU in the computing node may allocate an available memory of the storage node to a service process in the computing node based on the memory address assignment information. For the service process, the service process only needs to interact with the DPU in the computing node to obtain the available memory, and may further write data into the available memory of the storage node by using the DPU in the computing node. Different service processes in the computing node do not need to respectively establish communication links to the storage node. Only one communication link needs to be established between a single computing node and storage nodes via a DPU. This solution greatly reduces a quantity of links between the computing node and the storage node, and can avoid a problem that memory overheads are excessively high due to an excessive quantity of links between the computing node and the storage node. Therefore, data transmission efficiency between the computing node and the storage node can be ensured, so that data processing efficiency can be improved, and data processing reliability and stability are improved.

Optionally, after the first DPU sends the write data request to the second DPU over the communication link, when the first DPU receives a write data response from the second DPU over the communication link, and the write data response indicates that the first data is successfully written, the first DPU sends a data storage response to the first service process. The data storage response indicates that the first data is successfully stored. The first service process stores, in a metadata service device, first metadata corresponding to the first data. The first metadata includes the first memory address. The metadata service device may be the computing node, or may be another device independent of the computing node and the storage node.

Optionally, when the first DPU receives a data read request from a second service process in the computing node, the first DPU sends a read data request to the second DPU over the communication link. The data read request includes a second memory address. The second memory address is the virtual memory address corresponding to the physical memory of the storage node. The read data request includes the second memory address. The read data request is used for requesting the second DPU to read second data from the physical memory corresponding to the second memory address.

In this application, when the service process needs to read data from the storage node, the service process only needs to pull the data from a corresponding memory of the storage node by using the DPU in the computing node. The different service processes in the computing node do not need to respectively establish the communication links to the storage node. The only one communication link needs to be established between the single computing node and the storage nodes via the DPU. This solution greatly reduces the quantity of links between the computing node and the storage node, and can avoid the problem that the memory overheads are excessively high due to the excessive quantity of links between the computing node and the storage node. Therefore, the data transmission efficiency between the computing node and the storage node can be ensured, so that the data processing efficiency can be improved, and the data processing reliability and stability are improved.

Optionally, after the first DPU sends the read data request to the second DPU over the communication link, when the first DPU receives, from the second DPU over the communication link, a read data response that includes the second data, the first DPU writes the second data into a target buffer of the computing node. The second service process reads the second data from the target buffer.

Optionally, the read data request further includes a buffer address of the target buffer, and the read data request is used for requesting the second DPU to write, into the target buffer, the data read from the physical memory corresponding to the second memory address. Correspondingly, the read data response further includes the buffer address of the target buffer, and the read data response indicates the first DPU to write the second data into the target buffer.

Optionally, the first service process is a map process. Optionally, the second service process is a reduce process.

Optionally, the first DPU establishes the communication link to the second DPU after the computing node is powered on. Then, the first DPU receives the memory address assignment information sent by the second DPU. The communication link may be a persistent connection.

Optionally, the first DPU includes a first RDMA network interface card, and the second DPU includes a second RDMA network interface card. The communication link between the first DPU and the second DPU is an RDMA link established between the first RDMA network interface card and the second RDMA network interface card.

According to a second aspect, a data processing method is provided, and is applied to a storage node. The storage node includes a first DPU. A communication link is established between the first DPU and a second DPU in a computing node. The method includes: The first DPU receives a write data request from the second DPU over the communication link. The write data request includes first data and a first memory address. The first memory address is a virtual memory address corresponding to a physical memory allocated by the storage node to the computing node. The first DPU writes the first data into the physical memory corresponding to the first memory address. The first DPU sends a write data response to the second DPU over the communication link. The write data response indicates that the first data is successfully written.

Optionally, the first DPU receives a read data request from the second DPU over the communication link. The read data request includes a second memory address. The second memory address is the virtual memory address corresponding to the physical memory of the storage node. The first DPU reads second data from the physical memory corresponding to the second memory address. The first DPU sends a read data response to the second DPU over the communication link. The read data response includes the second data.

Optionally, the read data request further includes a buffer address of a target buffer, and the read data request is used for requesting the first DPU to write, into the target buffer, the data read from the physical memory corresponding to the second memory address. Correspondingly, the read data response further includes the buffer address of the target buffer, and the read data response indicates the second DPU to write the second data into the target buffer.

Optionally, the first DPU obtains the virtual memory address corresponding to the physical memory of the storage node. The first DPU sends memory address assignment information to the second DPU after the first DPU establishes the communication link to the second DPU. The memory address assignment information includes the virtual memory address corresponding to the physical memory allocated by the storage node to the computing node.

Optionally, the storage node includes a plurality of storages. An implementation in which the first DPU obtains the virtual memory address corresponding to the physical memory of the storage node includes: The first DPU uniformly addresses the plurality of storages to obtain the virtual memory address corresponding to the physical memory of the storage node.

Optionally, the first DPU includes a first RDMA network interface card, and the second DPU includes a second RDMA network interface card. The communication link between the first DPU and the second DPU is an RDMA link established between the first RDMA network interface card and the second RDMA network interface card.

Optionally, the storage node includes a solid-state drive. The first DPU is connected to the solid-state drive through a memory access interface. The memory access interface includes a buffer and a memory control chip. The buffer is configured to store to-be-stored data written by the first DPU into the solid-state drive. The memory control chip is configured to write the to-be-stored data in the buffer into the solid-state drive. The memory control chip is further configured to write, into the buffer, to-be-read data read by the first DPU from the solid-state drive, to enable the first DPU to read the to-be-read data from the buffer.

In this application, a DPU in the storage node may directly read/write data from/into the solid-state drive through the memory access interface, without using an OS file system, so that disk access efficiency can be improved, thereby improving data processing efficiency.

Optionally, the memory access interface is integrated on the solid-state drive.

According to a third aspect, a computing node is provided. The computing node includes a DPU. The DPU includes a plurality of functional modules. The plurality of functional modules interact with each other to implement the method according to the first aspect and the implementations of the first aspect. The plurality of functional modules may be implemented based on software, hardware, or a combination of software and hardware, and the plurality of functional modules may be randomly combined or divided based on specific implementation.

According to a fourth aspect, a storage node is provided. The storage node includes a DPU. The DPU includes a plurality of functional modules. The plurality of functional modules interact with each other to implement the method according to the second aspect and the implementations of the second aspect. The plurality of functional modules may be implemented based on software, hardware, or a combination of software and hardware, and the plurality of functional modules may be randomly combined or divided based on specific implementation.

According to a fifth aspect, a computing node is provided, and includes a DPU and a central processing unit (CPU). The CPU is configured to invoke a computer program including program instructions, to run a service process. The DPU is configured to invoke a computer program including program instructions, to implement actions performed by the first DPU in the first aspect and the implementations of the first aspect.

According to a sixth aspect, a storage node is provided, and includes a DPU and a storage. The DPU is configured to invoke a computer program including program instructions, to read data from the storage and/or write data into the storage, to implement actions performed by the first DPU in the second aspect and the implementations of the second aspect.

According to a seventh aspect, a data processing system is provided, and includes the computing node according to the third aspect or the fifth aspect and the storage node according to the fourth aspect or the sixth aspect. The data processing system may be used in a remote shuffle architecture.

The computing node includes a first DPU and a CPU. The storage node includes a second DPU and a storage. A communication link is established between the first DPU and the second DPU. The first DPU stores memory address assignment information. The memory address assignment information indicates a virtual memory address corresponding to a physical memory allocated by the storage node to the computing node. The physical memory of the storage node belongs to the storage.

In a process (shuffle write process) in which the computing node writes data into the storage node, the CPU is configured to send a memory allocation request from a first service process to the first DPU. The first service process is any map process running on the CPU. The first DPU is configured to determine, based on the memory address assignment information and in the virtual memory address corresponding to the physical memory allocated by the storage node to the computing node, a virtual memory address range assigned to the first service process. The CPU is further configured to send a data storage request from the first service process to the first DPU. The data storage request includes first data and a first memory address. The first memory address belongs to the virtual memory address range assigned by the first DPU to the first service process. The first DPU is configured to send a write data request to the second DPU over the communication link between the first DPU and the second PDU. The write data request includes the first data and the first memory address. The second DPU is configured to write the first data into the physical memory corresponding to the first memory address. The second DPU is further configured to send a write data response to the first DPU over the communication link between the first DPU and the second PDU. The write data response indicates that the first data is successfully written.

In a process (shuffle read process) in which the computing node reads data from the storage node, the CPU is configured to send a data read request from a second service process to the first DPU. The data read request includes a second memory address. The second memory address is the virtual memory address corresponding to the physical memory of the storage node. The second service process is any reduce process running on the CPU. The first DPU is configured to send a read data request to the second DPU over the communication link between the first DPU and the second PDU. The read data request includes the second memory address. The second DPU is configured to read second data from the physical memory corresponding to the second memory address. The second DPU is further configured to send a read data response to the first DPU over the communication link between the first DPU and the second PDU. The read data response includes the second data.

According to an eighth aspect, a computer-readable storage medium is provided. The computer-readable storage medium stores instructions; and when the instructions are executed by a processor, the method according to the first aspect and the implementations of the first aspect or the method according to the second aspect and the implementations of the second aspect is implemented.

According to a ninth aspect, a computer program product is provided, and includes a computer program; and when the computer program is executed by a processor, the method according to the first aspect and the implementations of the first aspect or the method according to the second aspect and the implementations of the second aspect is implemented.

According to a tenth aspect, a chip is provided. The chip includes a programmable logic circuit and/or program instructions; and when the chip runs, the method according to the first aspect and the implementations of the first aspect or the method according to the second aspect and the implementations of the second aspect is implemented.

DESCRIPTION OF EMBODIMENTS

To make the objectives, technical solutions, and advantages of this application clearer, the following further describes the implementations of this application in detail with reference to the accompanying drawings.

A MapReduce model is the most classic and important processing model in distributed big data processing, and derives distributed big data processing frameworks such as Hadoop, Spark, Flink, and Tez. In a current MapReduce software implementation, a map function and a concurrent reduce function are specified. The map function is used for mapping a group of key-value pairs to a new group of key-value pairs. The reduce function is used for ensuring that all key-value pairs having mapping relationships share a same key group.

Shuffle is a task processing phase in a MapReduce framework, and refers to a process in which data is processed and exchanged, according to specific rules, from a node on which a map task is located to a node on which a reduce task is located. In other words, the shuffle describes a process in which the data is output from the map task and input to the reduce task. The shuffle is a bridge connecting map and reduce. In a distributed mode, the reduce task needs to pull an output result of a map task on another node. Therefore, an output of map needs to pass through the shuffle process before being used in the reduce. The shuffle process may cause network resource consumption and memory and disk input/output (I/O) consumption.

Generally, the shuffle is divided into two parts: data preparation in a map phase and data copy processing in a reduce phase. The data preparation in the map phase, that is, shuffle on a map end, is also referred to as shuffle write. The data copy processing in the reduce phase, that is, shuffle on a reduce end, is also referred to as shuffle read.

A shuffle process on the map end includes partition, spill, and merge. The partition means that after data is input, a data split read by the map task is written into a corresponding memory buffer. Each map task has a corresponding memory buffer, which is used for storing output data of the map task. The spill means that when the memory buffer is about to be full, data in the memory buffer is stored in a disk as a temporary file. The merge means that after the entire map task ends, all temporary files generated by the map task in the disk are merged to generate a final output file, that is, an output result of the map task.

A shuffle process on the reduce end includes copy and merge. The copy means pulling, from a node on which each map task is currently run, an output result of the map task. The merge refers to sorting and merging data obtained from the node on which each map task is located, to form a file as an input file of the reduce task.

Figure 1:
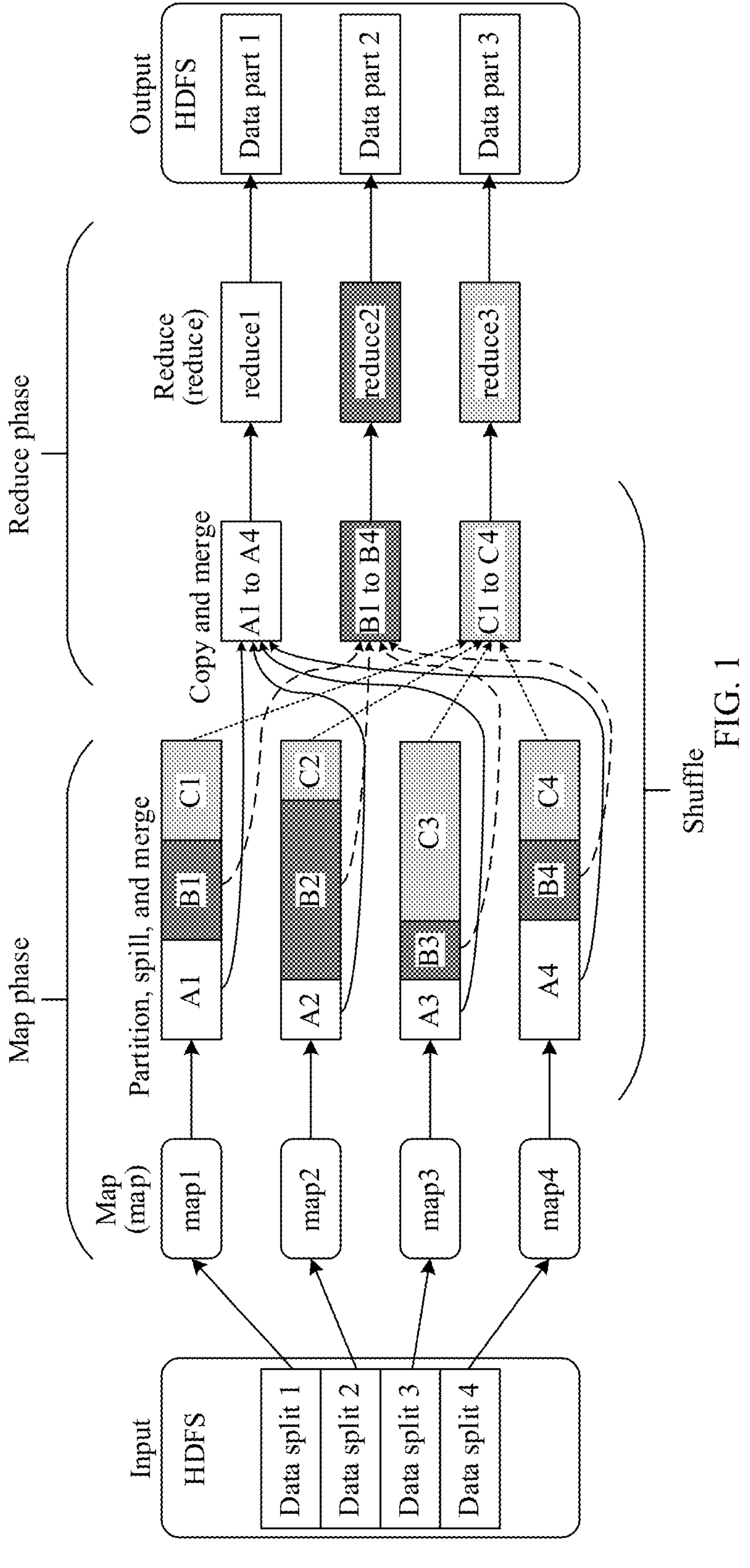
FIG. 1 is a diagram of a shuffle process according to an embodiment of this application.

For example, FIG. 1 is a diagram of a shuffle process according to an embodiment of this application. In FIG. 1, Hadoop MapReduce shuffle is used as an example, and the shuffle process is presented in a data flow manner. As shown in FIG. 1, a Hadoop distributed file system (HDFS) includes four data splits, which are respectively data splits 1 to 4. The four data splits are input data. Four map tasks are run on a map end, which are denoted as map1 to map4 respectively. Three reduce tasks are run on a reduce end, and are denoted as reduce1 to reduce3 respectively. In a map phase, each map task processes a data split. map1 processes the data split 1, map2 processes the data split 2, map3 processes the data split 3, and map4 processes the data split 4. Each map task generates an output file through shuffle (partition, spill, and merge). Each output file includes three parts of data, where the three parts of data are respectively processed by three reduce tasks. An output file generated by map1 includes data A1, data B1, and data C1, an output file generated by map2 includes data A2, data B2, and data C2, an output file generated by map3 includes data A3, data B3, and data C3, and an output file generated by map4 includes data A4, data B4, and data C4. In a reduce phase, each reduce task pulls, through shuffle (copy and merge), a part of data from the output files generated by the four map tasks, and merges the four pieces of data obtained from the output files generated by the four map tasks as an input file of a corresponding reduce task. An input file obtained by reduce1 includes data A1 to A4, an input file obtained by reduce2 includes data B1 to B4, and an input file obtained by reduce3 includes data C1 to C4. Then, each reduce task reduces and calculates the obtained input files and outputs final processing results to the HDFS. A processing result output by reduce1 is a data part 1, an output result of reduce2 is a data part 2, and an output result of reduce3 is a data part 3.

Figure 2:
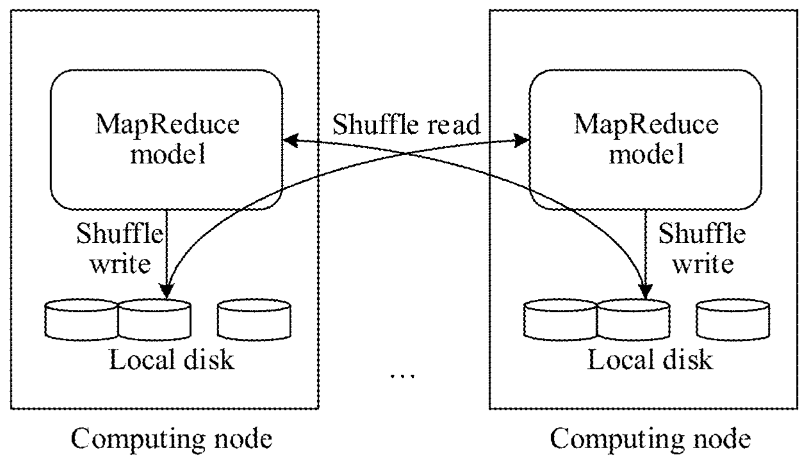
FIG. 2 is a diagram of an architecture in which a local disk uses shuffle in a conventional technology.

In a conventional technology, a MapReduce model is separately deployed on a plurality of computing nodes, to implement distributed big data processing. A computing node may be, for example, a server, or a server cluster including a plurality of servers. In a conventional implementation, a local disk is usually deployed on the computing node, and the computing node spills temporary data generated in the shuffle process into the local disk. For example, FIG. 2 is a diagram of an architecture in which a local disk uses shuffle in a conventional technology. As shown in FIG. 2, a MapReduce model on a computing node stores generated temporary data to the local disk through shuffle write, and remotely reads data in a local disk of another computing node to the local through shuffle read.

Currently, local disks are deployed on the computing node in two forms. One form is that more than 10 hard disk drives (HDDs) are deployed on the computing node. In this form, a large quantity of disk slots are required, and the local disks occupy large space. Another form is that two trillion byte (TB)-level non-volatile memory express (NVMe) solid-state drives (SSDs) are deployed on the computing node. Hardware costs of this form are high.

Figure 3:
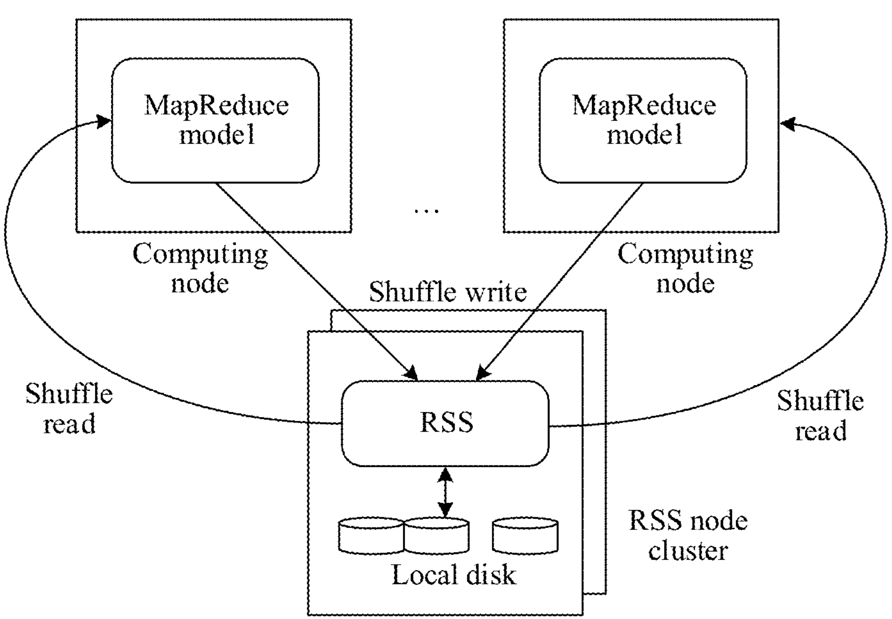
FIG. 3 is a diagram of a remote shuffle architecture in a conventional technology.

In the trend of separation and cloudification of big data storage and computing, a remote shuffle architecture is proposed in the industry to reduce hardware costs and improve resource utilization. In the remote shuffle architecture, disks are uniformly deployed on an RSS node. In this way, no local disk needs to be deployed or a small quantity of local disks may be deployed on the computing node. The computing node stores the temporary data generated during shuffle in a local disk of the RSS node. For example, FIG. 3 is a diagram of a remote shuffle architecture in a conventional technology. As shown in FIG. 3, the remote shuffle architecture includes a plurality of computing nodes and an RSS node cluster. The RSS node cluster includes one or more RSS nodes. A MapReduce model on the computing node stores generated temporary data in a local disk of the RSS node through shuffle write, and remotely reads data in the local disk of the RSS node to the local through shuffle read.

In the remote shuffle architecture, because no local disk needs to be deployed or a small quantity of local disks may be deployed on the computing node, a size of the computing node can be greatly reduced. Therefore, high-density deployment of the computing nodes can be implemented, to implement high-density computing. In addition, an existing distributed computing framework (where for example, Spark stores shuffle data depending on a local disk) greatly limits a cloud native deployment mode. The remote shuffle architecture can effectively reduce dependency on the local disk and support a plurality of cluster deployment modes, to improve resource utilization and facilitate a cloud native architecture.

Figure 4:
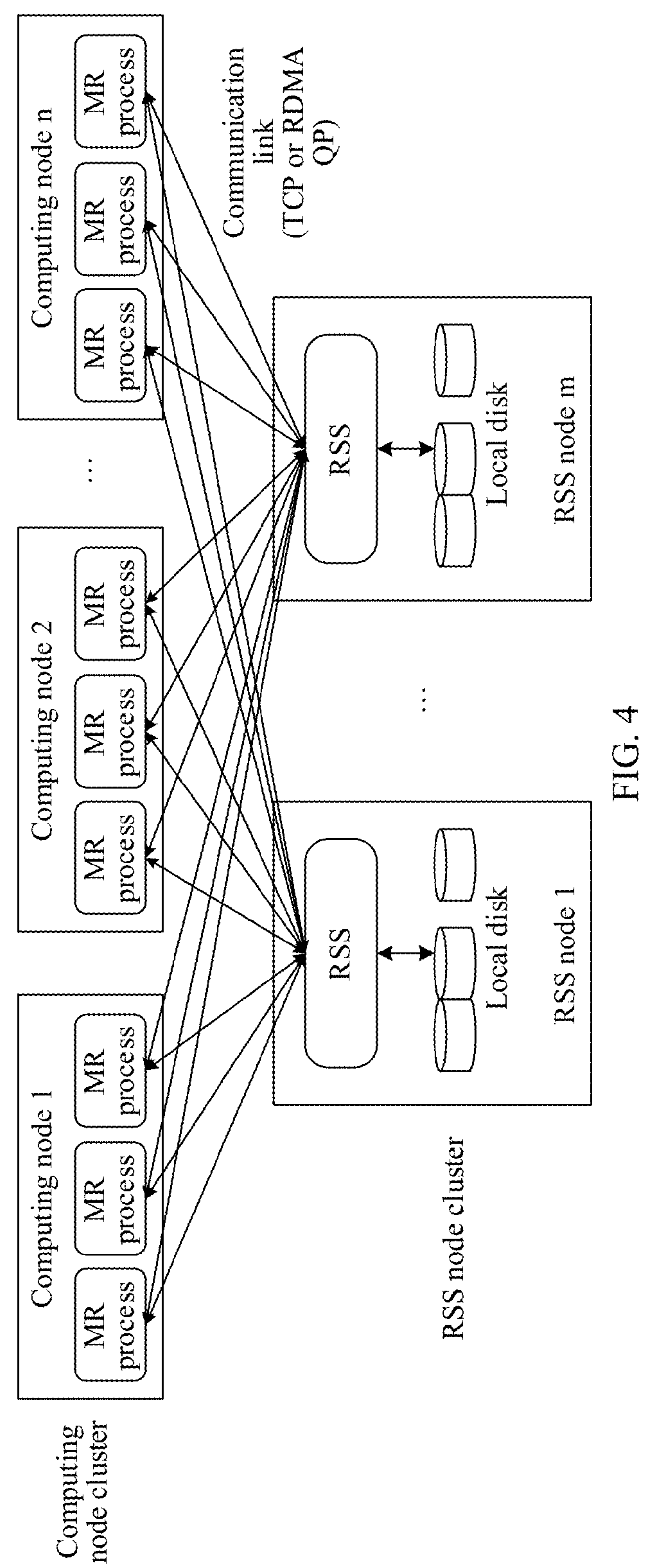
FIG. 4 is a diagram of data interaction in a remote shuffle architecture in a conventional technology.

In the remote shuffle architecture, both the shuffle read and the shuffle write are performed through a network. Therefore, data transmission efficiency is a key bottleneck. In the conventional technology, when the computing node needs to execute a map task or a reduce task, the computing node may run an MR process, and establishes a TCP link or an RDMA QP between the running MR process and an RSS process running on the RSS node, so that the MR process and the RSS process can perform data transmission over the TCP link or the RDMA QP. In addition, the RSS process interacts with the local disk deployed on the RSS node, to complete the shuffle read or the shuffle write of the computing node. For example, FIG. 4 is a diagram of data interaction in a remote shuffle architecture in a conventional technology. As shown in FIG. 4, the remote shuffle architecture includes a computing node cluster and an RSS node cluster. The computing node cluster includes n computing nodes, which are denoted as computing nodes 1 to n, where n is a positive integer. The RSS node cluster includes m RSS nodes, which are denoted as RSS nodes 1 to m, where m is a positive integer. A communication link (a TCP link or an RDMA QP) is established between each MR process on each computing node and an RSS process on the RSS node. The RSS process on the RSS node interacts with a local disk deployed on the RSS node to write data into the local disk or read data from the local disk.

In a big data processing scenario, one computing node may simultaneously execute a plurality of map tasks and/or reduce tasks, in other words, the computing node may simultaneously run a plurality of MR processes. Because each MR process needs to establish the communication link to the RSS process, there are a large quantity of communication links between the computing node and the RSS node, and an excessive quantity of links may cause sharp deterioration of data transmission performance. Therefore, currently, reliability of data transmission between the computing node and the RSS node is low. In particular, for the RSS node, because one RSS node needs to provide storage services for a plurality of computing nodes at the same time, there are massive communication links on the RSS node. This causes excessively high memory overheads of the RSS node and severely affects data transmission performance of the RSS node. In addition, each time the computing node executes a new map task or reduce task, a new communication link needs to be established with the RSS process on the RSS node. As a result, data processing efficiency of remote shuffle is low, and overheads of frequent link establishment are high, which affects processing performance of the computing node and the RSS node. Therefore, the data processing efficiency in the current remote shuffle architecture is low, and data processing stability and reliability are also low.

Based on this, embodiments of this application provide a technical solution. In this application, a DPU is separately deployed on a computing node and a storage node, and a communication link is established between the DPU in the computing node and the DPU in the storage node. The DPU in the storage node synchronizes memory address assignment information to the DPU in the computing node over the communication link, to enable the DPU in the computing node to pre-store a virtual memory address corresponding to a physical memory allocated by the storage node to the computing node. In this way, the computing node may implement remote direct memory mapping via the DPU, to implement direct access to the physical memory of the storage node. During specific implementation, the DPU in the computing node may allocate an available memory of the storage node to a service process in the computing node based on the memory address assignment information. For the service process, when shuffle write is performed, the service process only needs to interact with the DPU in the computing node to obtain the available memory, and may further write data into the available memory of the storage node by using the DPU in the computing node. When shuffle read is performed, the service process only needs to pull data from a corresponding memory of the storage node by using the DPU in the computing node. In the technical solution of this application, different service processes in the computing node do not need to respectively establish communication links to the storage node. Only one communication link needs to be established between a single computing node and storage nodes via a DPU. In comparison with the foregoing implementation solution of the existing remote shuffle architecture, this solution greatly reduces a quantity of links between the computing node and the storage node, and can avoid a problem that memory overheads are excessively high due to an excessive quantity of links between the computing node and the storage node. Therefore, data transmission efficiency between the computing node and the storage node can be ensured, so that data processing efficiency can be improved, and data processing reliability and stability are improved. In addition, because the quantity of links between the single computing node and the storage node is reduced, the storage node can provide storage services for more computing nodes while ensuring data transmission performance, to expand a system scale.

The following describes the technical solutions of this application in detail from a plurality of perspectives such as a system structure, a method procedure, a software apparatus, and a hardware apparatus.

Figure 5:
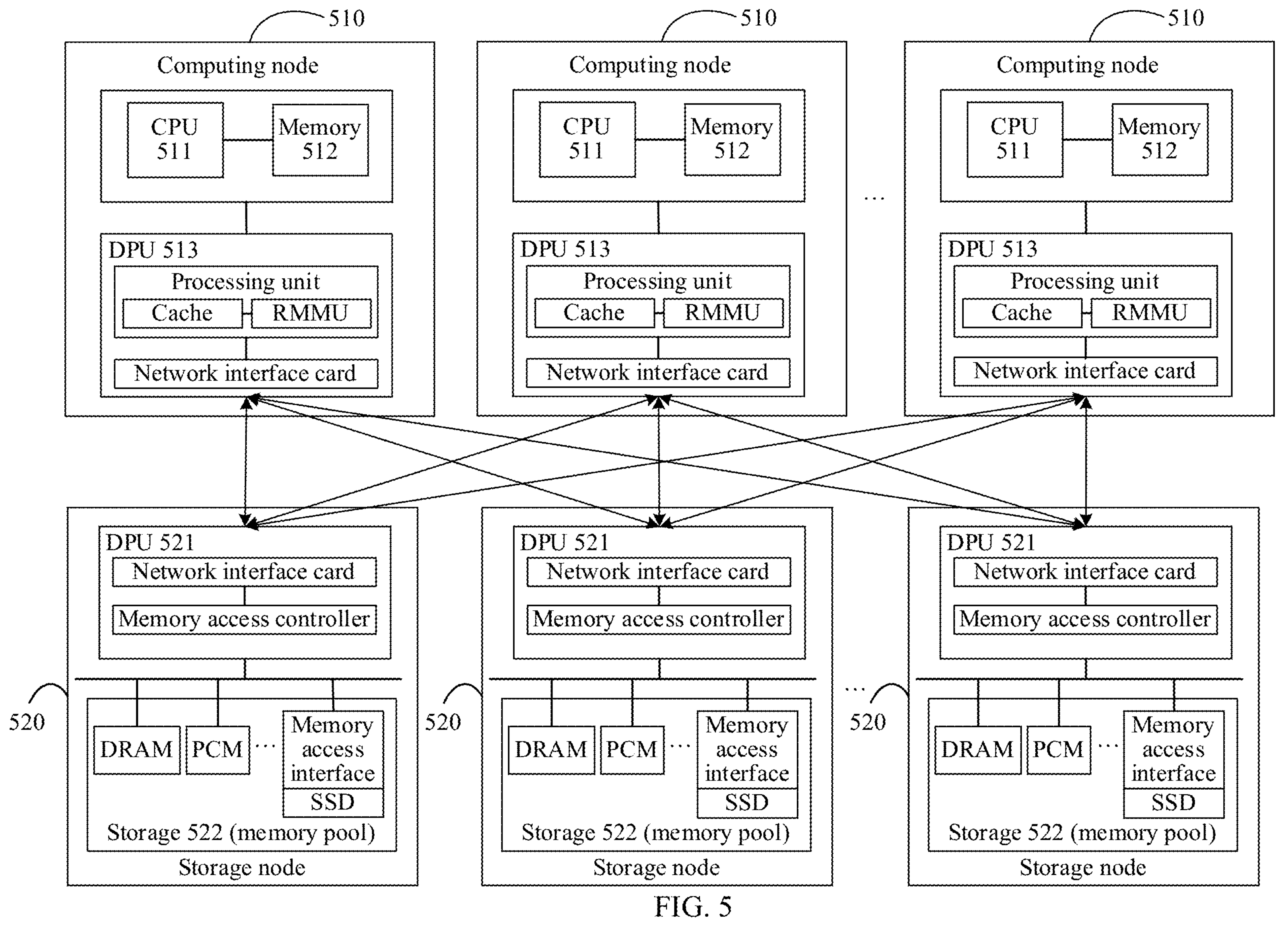
FIG. 5 is a diagram of a structure of a data processing system according to an embodiment of this application.

For example, FIG. 5 is a diagram of a structure of a data processing system according to an embodiment of this application. As shown in FIG. 5, the data processing system includes a computing node cluster and a storage node cluster. The computing node cluster includes one or more computing nodes 510 (where FIG. 5 shows three computing nodes 510, but is not limited to the three computing nodes 510), and the computing nodes 510 may communicate with each other. The storage node cluster includes one or more storage nodes 520 (where FIG. 5 shows three storage nodes 520, but is not limited to the three storage nodes 520).

The computing node 510 is a computing device, such as a server, a desktop computer, or a controller of a storage array. In terms of hardware, as shown in FIG. 5, one computing node 510 includes at least a processor 511, a memory 512, and a DPU 513. One storage node 520 includes a DPU 521 and one or more storages 522. The DPU has universality and programmability of a central processing unit (CPU), but is more dedicated, and can run efficiently on a network data packet, a storage request, or an analysis request. The DPU provides a network interface card function. The DPU may physically include a network interface card, or the DPU may be integrated with a network interface card, in other words, the DPU may alternatively not physically include an independent network interface card, and the DPU implements the network interface card function. In this embodiment of this application, an example in which the DPU physically includes the network interface card is used for description, but is not used to limit a structure form of the DPU.

In this embodiment of this application, a communication link is established between the DPU 513 in the computing node 510 and the DPU 521 on the storage node 520, to implement communication between the computing node 510 and the storage node 520. Optionally, the DPU 513 includes an RDMA network interface card, and the DPU 521 includes an RDMA network interface card. The DPU 513 establishes an RDMA link to the DPU 521 by using the RDMA network interface card. The RDMA link may be implemented by using a network interface card (NIC), a bus, or the like. Alternatively, the communication link between the DPU 513 and the DPU 521 may be a TCP link. A link establishment manner used between the DPUs is not limited in this embodiment of this application.

In the data processing system provided in this embodiment of this application, the DPU 513 in the computing node 510 and the DPU 521 in the storage node 520 may be fully interconnected. In this way, any computing node 510 in the computing node cluster may access any storage node 520 in the storage node cluster.

The following describes a hardware function of the computing node 510.

The processor 511 is a CPU, configured to process a data access request from outside the computing node 510 or a request generated inside the computing node 510. For example, when receiving write data requests sent by users, the processor 511 temporarily stores data in the write data requests to the memory 512. When a total amount of data in the memory 512 reaches a specific threshold, the processor 511 sends, via the DPU 513, the data stored in the memory 512 to the storage node 520 for persistent storage. The processor 511 reads/writes the data by running a service process. Service processes that may run on the processor 511 include but are not limited to a map process and a reduce process. For example, the processor 511 may write the data by running the map process, or may read the data by running the reduce process. In addition, the processor 511 is further configured to perform calculation or processing on the data, for example, metadata management, deduplication, data compression, virtualized storage space, and address translation. FIG. 5 shows only one CPU 511. In actual application, there are usually a plurality of CPUs 511, and one CPU 511 has one or more CPU cores. A quantity of CPUs and a quantity of CPU cores are not limited in this embodiment of this application.

The memory 512 is an internal storage that directly exchanges the data with the processor 511, can read/write the data at a high speed at any time, and serves as a temporary data storage of an operating system or another running program. The memory 512 includes at least two types of storages. For example, the memory 512 may be a random access memory, or may be a read-only memory (ROM). For example, the random access memory may be a dynamic random access memory (DRAM), or may be a storage class memory (SCM). The DRAM is a semiconductor storage, which is similar to most random access memories (RAMs) and belongs to a volatile memory device. The SCM uses a composite storage technology that combines features of both a conventional storage apparatus and a storage. The storage class memory can provide a faster read/write speed than a hard disk drive, but has a slower access speed than the DRAM, and has lower costs than the DRAM. However, the DRAM and the SCM are merely examples for description in this embodiment of this application, and the memory may further include another random access memory, for example, a static random access memory (SRAM). The read-only memory, for example, may be a programmable read-only memory (PROM) or an erasable programmable read-only memory (EPROM). In addition, the memory 512 may alternatively be a dual in-line memory module or a dual in-line memory module (DIMM), namely, a module including the dynamic random access memory (DRAM), or may be a solid-state drive (SSD). In actual application, a plurality of memories 512 and different types of memories 512 may be disposed on the computing node 510. A quantity and a type of the memories 512 are not limited in this embodiment of this application. In addition, the memory 512 may be configured to have a power failure protection function. The power failure protection function means that the data stored in the memory 512 is not lost even when a system is powered on again after a power failure. A memory with the power failure protection function is referred to as a non-volatile memory.

Optionally, refer to FIG. 5. The DPU 513 includes a processing unit and a network interface card. The processing unit may be a CPU. The processing unit includes a cache and a remote memory management unit (RMMU). The cache may be, for example, a DRAM. The RMMU is configured to store memory address assignment information from the storage node 520 in the storage node cluster. The memory address assignment information indicates a virtual memory address corresponding to a physical memory allocated by the storage node 520 to the computing node 510. The RMMU is further configured to allocate, based on the memory address assignment information, an available memory of the storage node 520 to the service process running on the processor 511, to enable the service process to write the data. The service process herein may be the map process. The RMMU is further configured to pull the data from the storage node 520 for the service process running on the processor 511, to complete a read data task of the service process. The service process herein may be the reduce process. In conclusion, the RMMU can communicate with the DPU 521 in the storage node 520 by using the network interface card, to complete the data read/write task of the service process running on the processor 511. The RMMU may further include a memory channel and a memory allocation module. The memory allocation module is configured to perform a data processing function of the RMMU, including but not limited to storing the memory address assignment information and allocating a memory for the service process. The memory channel is configured to perform a data transmission function of the RMMU, including but not limited to transmitting to-be-written data and to-be-read data of the service process.

The network interface card on the DPU 513 is configured to communicate with the storage node 520. For example, when the total amount of data in the memory 512 reaches the specific threshold, the computing node 510 may send a request to the storage node 520 by using the network interface card on the DPU 513, to perform persistent storage on the data. In addition, the computing node 510 may further include a bus, configured to perform communication between internal components of the computing node 510. In terms of functions, because a main function of the computing node 510 in FIG. 5 is a computing service, and a remote storage may be used for implementing the persistent storage when the data is stored, the computing node 510 has fewer local storages than a conventional server, thereby saving costs and space. However, this does not mean that the computing node 510 cannot have a local storage. During actual implementation, the computing node 510 may also have a small quantity of built-in hard disk drives or a small quantity of external hard disk drives.

The following describes a hardware function of the storage node 520.

One storage node 520 may have one memory pool. The memory pool includes the one or more storages 522 in the storage node 520. In other words, a physical memory of the memory pool of the storage node 520 is from various storages 522 included in the storage node 520. The storage 522 is configured to store the data, and may be a magnetic disk or a storage medium of another type. Optionally, one storage node 520 may include a plurality of different types of storages, including but not limited to a DRAM, a phase change memory (PCM), and an SSD.

Optionally, refer to FIG. 5. The DPU 521 includes a memory access controller and a network interface card. The memory access controller may be a CPU. The memory access controller has data read/write, address translation, and other computing functions. The memory access controller is configured to uniformly address the storages included in the memory pool. After the storages are uniformly addressed, each segment of space of the memory pool has a unique global address in an entire storage node cluster. After physical space is allocated to a segment of space of the memory pool, a global address of the space has a physical address corresponding to the global address. The physical address indicates a specific storage on a specific service node on which the space represented by the global address is actually located and an offset in the storage, that is, a position of the physical space. In other words, the global address allocated to the segment of space of the memory pool is a virtual memory address, and the global address corresponds to a physical address of a physical memory. For example, the global address of the segment of space of the memory pool may be represented by using a 64-bit address. The global address includes four parts of content, and is represented as [hostId, media type, numaId, blockIndex]. The hostId is an identifier of the storage node, and occupies 0 to 15 bits of the global address. The media type is a media type, and occupies 16 to 18 bits of the global address. The numaId is a memory module identifier, and occupies 19 to 22 bits of the global address. The blockIndex is a block index, and occupies 23 to 63 bits of the global address.

The memory access controller is configured to write data into the storage 522 or read data from the storage 522 based on a read/write data request sent by the computing node 510. In a data read/write process, the memory access controller needs to convert a virtual memory address carried in the read/write data request into a physical address that can be identified by the storage 522.

Optionally, refer to FIG. 5. The storage 522 in the storage node 520 includes but is not limited to a DRAM, a PCM, and an SSD. The DPU 521 may be connected to the SDD through a memory access interface. The memory access interface includes a buffer and a memory control chip. The buffer in the memory access interface is configured to store to-be-stored data written by the DPU 521 into the SSD. The memory control chip is configured to write the to-be-stored data in the buffer into the SSD. The memory control chip is further configured to write, into the buffer, to-be-read data read by the DPU 521 from the SSD, to enable the DPU 521 to read the to-be-read data from the buffer. Optionally, the memory access interface may be integrated on the SSD. Alternatively, the memory access interface may be used as an independent component to connect the SSD and the DPU 521.

In a conventional technology, an RSS node needs to interact with the SSD through an RSS process to complete data read/write, and the RSS process needs to access the SSD by using an operating system (OS) file system. Limited by the OS file system, disk access efficiency is low. In this embodiment of this application, a DPU in a storage node may directly read/write data from/into the SSD through the memory access interface, without using the OS file system, so that the disk access efficiency can be improved, thereby improving data processing efficiency.

The network interface card on the DPU 521 is configured to communicate with the computing node 510. For example, after the memory access controller of the DPU 521 completes unified addressing on the storages included in the memory pool in the storage node 520, the memory address assignment information may be sent to the computing node 510 by using the network interface card on the DPU 521. In addition, the storage node 520 may further include a bus, configured to perform communication between internal components of the storage node 520.

Optionally, the communication link between the DPU 513 in the computing node 510 and the DPU 521 in the storage node 520 is a persistent connection, in other words, the communication link between the DPU 513 in the computing node 510 and the DPU 521 in the storage node 520 exists for a long time. In this way, there is no need to frequently establish a link between the computing node 510 and the storage node 520, so that processing resources of the computing node and the storage node can be saved. After being powered on, the computing node 510 and the storage node 520 first implement full interconnection and memory address mapping via the DPU.

For the storage node 520, after the storage node 520 is powered on, the DPU 521 in the storage node 520 obtains the virtual memory address corresponding to the physical memory of the storage node 520. If the storage node 520 includes a plurality of storages, the DPU 521 may uniformly address the plurality of storages to obtain the virtual memory address corresponding to the physical memory of the storage node 520. When the DPU 521 includes the network interface card and the memory access controller, specifically, the memory access controller may uniformly address the plurality of storages, and then perform memory registration on the network interface card, so that the network interface card may directly read/write data from/into the physical memory.

For the computing node 510, after the computing node 510 is powered on, the DPU 513 in the computing node 510 establishes the communication link to the DPU 521 in the storage node 520. Then, the DPU 521 in the storage node 520 may send the memory address assignment information to the DPU 513 in the computing node 510. The memory address assignment information includes the virtual memory address corresponding to the physical memory allocated by the storage node 520 to the computing node 510. Optionally, when the computing node 510 needs to write data into the storage node 520, the computing node 510 may request for an available memory from the storage node 520 through a pre-established communication link, and then the storage node 520 allocates the memory to the computing node 510 over the communication link. Alternatively, after the DPU 513 in the computing node 510 establishes the communication link to the DPU 521 in the storage node 520, the storage node 520 may directly allocate a memory to the computing node 510 over the communication link. After receiving the memory address assignment information from the storage node 520, the DPU 513 in the computing node 510 stores the memory address assignment information, and initializes a memory mapping relationship. The memory mapping relationship includes but is not limited to a specific storage node to which a memory address of the available memory allocated to the computing node 510 belongs, a start address and a memory size that correspond to each type of storage in the storage node to which the available memory belongs, an access protocol, a port number, and a transmission protocol that are used when the computing node 510 accesses the storage node 520 to which the available memory belongs, and the like.

A DPU 521 in one storage node 520 usually establishes communication links to DPUs 513 on a plurality of computing nodes 510. The storage node 520 separately allocates different memories to different computing nodes 510, in other words, physical memories allocated to the different computing nodes 510 are completely different.

Figure 6:
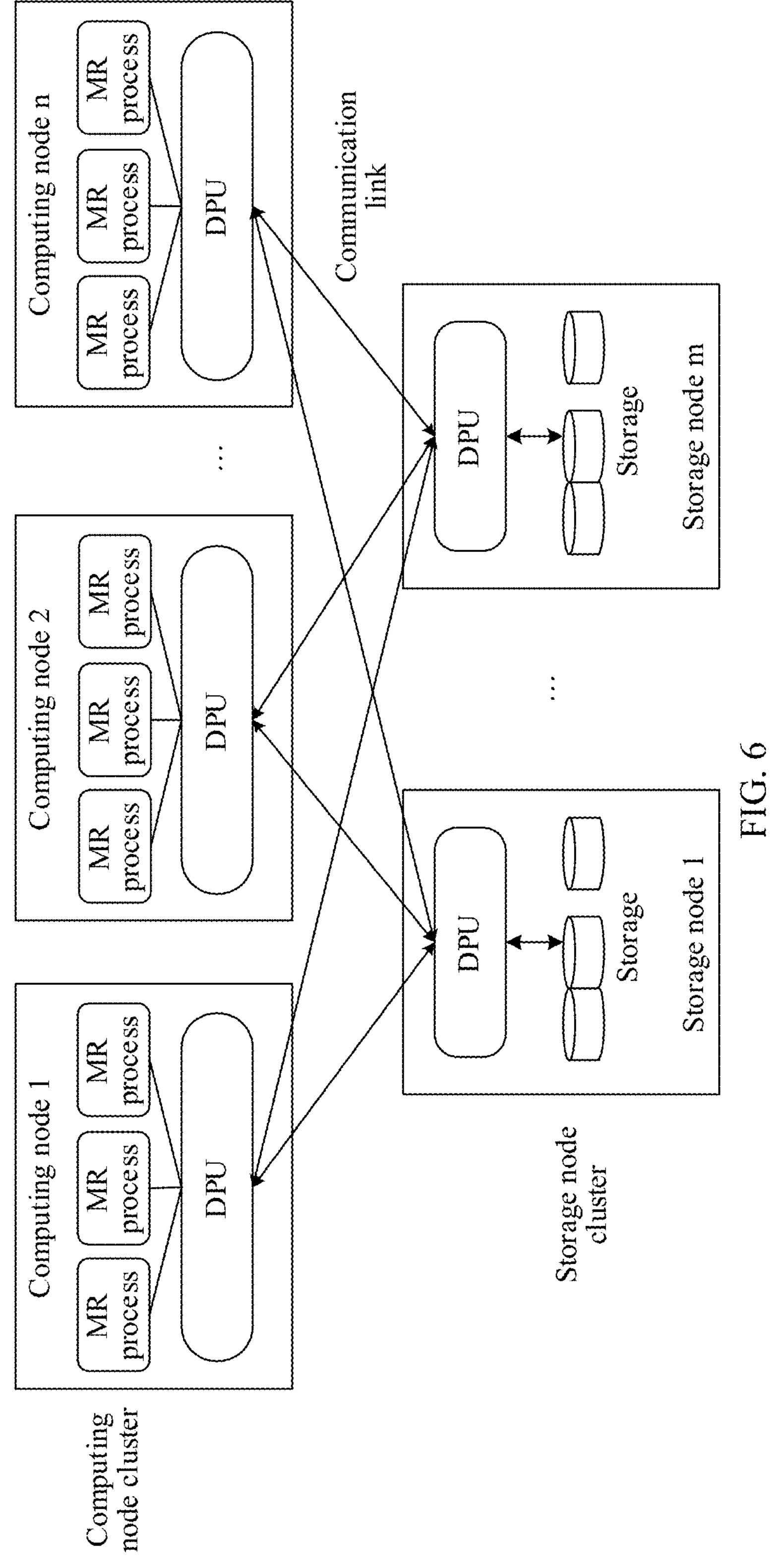
FIG. 6 is a diagram of data interaction in a remote shuffle architecture according to an embodiment of this application.

After the DPU 513 in the computing node 510 establishes the communication link to the DPU 521 in the storage node 520, and the DPU 513 in the computing node 510 receives the memory address assignment information from the storage node 520, the computing node 510 may implement a data read/write function of the storage node 520 via the DPU 513. For example, FIG. 6 is a diagram of data interaction in a remote shuffle architecture according to an embodiment of this application. As shown in FIG. 6, the remote shuffle architecture includes a computing node cluster and a storage node cluster. The computing node cluster includes n computing nodes, which are denoted as computing nodes 1 to n, where n is a positive integer. The storage node cluster includes m storage nodes, which are denoted as storage nodes 1 to m, where m is a positive integer. Each MR process in the computing node is connected to a DPU in the computing node. DPUs in the n computing nodes establish communication links with DPUs in the m storage nodes respectively. Each MR process in the computing node interacts with the DPU in the computing node, the DPU in the computing node performs data transmission with the DPU in the storage node over the communication link, and the DPU in the storage node interacts with a storage in the storage node, so that the MR process in the computing node can write data into the storage in the storage node or the MR process in the computing node can read data from the storage in the storage node.

With reference to FIG. 4 and FIG. 6, it can be learned from comparison that, in comparison with the remote shuffle architecture implementation in the conventional technology, a remote shuffle architecture implementation in this application greatly reduces a quantity of links between the computing node and the storage node, and can avoid a problem that memory overheads are excessively high due to an excessive quantity of links between the computing node and the storage node. Therefore, data transmission efficiency between the computing node and the storage node can be ensured, so that data processing efficiency can be improved, and data processing reliability and stability are improved.

The following describes an example of a method procedure in embodiments of this application.

A data processing method provided in embodiments of this application includes two parts: data write and data read. In this application, an implementation procedure of the data write and an implementation procedure of the data read are respectively described by using the following two embodiments. For ease of example, in the implementation procedure (the method shown in FIG. 7) of the data write, an example in which a data processing system includes a computing node 1 and a storage node 1 is used for description. The computing node 1 includes a DPU 1, the storage node 1 includes a DPU 2, and a communication link 1 is established between the DPU 1 and the DPU 2. In the implementation procedure (the method shown in FIG. 8) of the data read, an example in which a data processing system includes a computing node 2 and a storage node 2 is used for description. The computing node 2 includes a DPU 3, the storage node 2 includes a DPU 4, and a communication link 2 is established between the DPU 3 and the DPU 4. In actual application, any computing node in the data processing system may have a function of the computing node 1 and/or the computing node 2. Similarly, any storage node in the data processing system may have a function of the storage node 1 and/or the storage node 2.

Figure 7:
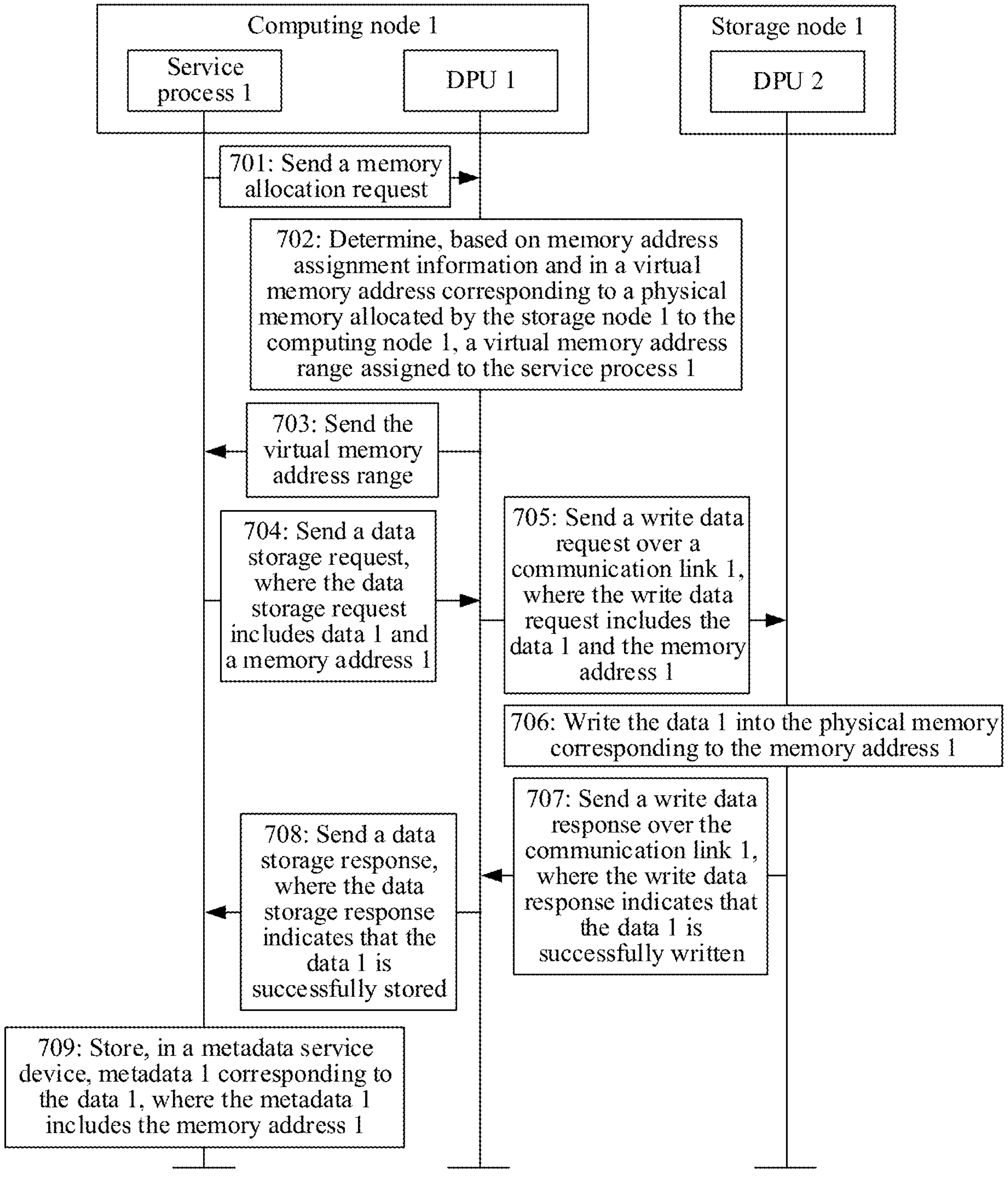
FIG. 7 is a schematic flowchart of a data processing method according to an embodiment of this application.

In an embodiment of this application, an implementation procedure in which a computing node writes data into a storage node is shown. For example, FIG. 7 is a schematic flowchart of a data processing method according to an embodiment of this application. The method may be applied to the data processing system shown in FIG. 5. A computing node 1 may be any computing node 510 in the data processing system shown in FIG. 5, and a storage node 1 may be any storage node 520 in the data processing system shown in FIG. 5. As shown in FIG. 7, the method includes the following steps.

Step 701: A service process 1 sends a memory allocation request to a DPU 1.

The service process 1 is a service process running on the computing node 1. The service process 1 may be, for example, a map process. Optionally, the memory allocation request includes an indication for a memory size, to request the DPU 1 to allocate memory space of a corresponding size to the service process 1.

Step 702: The DPU 1 determines, based on memory address assignment information and in a virtual memory address corresponding to a physical memory allocated by the storage node 1 to the computing node 1, a virtual memory address range assigned to the service process 1.

The memory address assignment information indicates the virtual memory address corresponding to the physical memory allocated by the storage node 1 to the computing node 1. In a possible case, if the virtual memory address corresponding to the physical memory allocated by the storage node 1 to the computing node 1 is a continuous virtual memory address segment, the memory address assignment information may include a start address and an end address of the virtual memory address segment, for example, represented as <start address, end address>; the memory address assignment information may include a start address and an address length of the virtual memory address segment, for example, represented as <start address, address length>; or the memory address assignment information may include an end address and an address length of the virtual memory address segment, for example, represented as <end address, address length>. In another possible case, if the virtual memory address corresponding to the physical memory allocated by the storage node 1 to the computing node 1 includes a plurality of discontinuous virtual memory address segments, the memory address assignment information may include a start address and an end address of each virtual memory address segment, for example, represented as {<start address 1, end address 1>; <start address 2, end address 2>; . . . }; may include a start address and an address length of each virtual memory address segment, for example, represented as {<start address 1, address length 1>; <start address 2, address length 2>; . . . }; or may include an end address and an address length of each virtual memory address segment, for example, represented as {<end address 1, address length 1>; <end address 2, address length 2>; . . . }.

Optionally, if the memory allocation request includes the indication for the memory size, the DPU 1 may allocate the memory space of the corresponding size to the service process 1, and provide the service process 1 with a virtual memory address range corresponding to the allocated memory space.

Step 703: The DPU 1 sends the virtual memory address range to the service process 1.

Step 704: The service process 1 sends a data storage request to the DPU 1, where the data storage request includes data 1 and a memory address 1.

The memory address 1 belongs to the virtual memory address range assigned by the DPU 1 to the service process 1. The data storage request is used for requesting to write the data 1 into the physical memory corresponding to the memory address 1. The service process 1 sends the data storage request to the DPU 1, in other words, the service process 1 initiates a shuffle write procedure.

Step 705: The DPU 1 sends a write data request to a DPU 2 over a communication link 1, where the write data request includes the data 1 and the memory address 1.

The write data request is used for requesting the DPU 2 to write the data 1 into the physical memory corresponding to the memory address 1.

Step 706: The DPU 2 writes the data 1 into the physical memory corresponding to the memory address 1.

After receiving the write data request from the DPU 1 over the communication link 1, the DPU 2 determines, based on the memory address 1 carried in the write data request, a physical memory address corresponding to the memory address 1, and then writes the data 1 carried in the write data request into the physical memory corresponding to the physical memory address.

Optionally, a storage in the storage node 1 includes an SSD, the DPU 2 is connected to the SSD through a memory access interface, and the memory access interface includes a buffer and a memory control chip. If the physical memory corresponding to the memory address 1 belongs to the SSD, an implementation process in which the DPU 2 writes the data 1 into the physical memory corresponding to the memory address 1 includes: The DPU 2 first writes the data 1 into the buffer of the memory access interface, and then the memory control chip writes the data 1 in the buffer into physical space corresponding to the memory address 1 in the SSD. In this way, a DPU in a storage node may directly write data into the SSD through the memory access interface, without using an OS file system, so that disk access efficiency can be improved, thereby improving data processing efficiency.

Optionally, after successfully writing the data 1 into the physical memory corresponding to the memory address 1, the DPU 2 may perform the following step 707. If the DPU 2 does not successfully write the data 1 into the physical memory corresponding to the memory address 1, the DPU 2 may send a write data failure response to the DPU 1 over the communication link 1, to indicate that the data 1 is not successfully written. Alternatively, the DPU 2 may not send, to the DPU 1, any response to the write data request. After the DPU 1 does not receive, over the communication link 1, a response to the write data request from the DPU 2 within specific duration after the write data request is sent, the DPU 1 independently determines that the data 1 is not successfully written. After determining that the data 1 is not successfully written, the DPU 1 may further send a data storage failure response to the service process 1, to enable the service process 1 to perform data rewrite.

Step 707: The DPU 2 sends a write data response to the DPU 1 over the communication link 1, where the write data response indicates that the data 1 is successfully written.

Optionally, after receiving, from the DPU 2 over the communication link 1, the write data response indicating that the data 1 is successfully written, the DPU 1 may perform the following step 708.

Step 708: The DPU 1 sends a data storage response to the service process 1, where the data storage response indicates that the data 1 is successfully stored.

Optionally, after receiving the data storage response indicating that the data 1 is successfully stored, the service process 1 may perform the following step 709.

Step 709: The service process 1 stores, in a metadata service device, metadata 1 corresponding to the data 1, where the metadata 1 includes the memory address 1.

Optionally, the metadata service device may be the computing node 1. Storage space of the computing node 1 that is specially used to store metadata may be obtained through division. The service process 1 may write, into the storage space of the computing node 1, the metadata 1 corresponding to the data 1. Alternatively, the metadata service device may be another device independent of the computing node 1 and the storage node 1. After the service process 1 writes, into the metadata service device, the metadata 1 corresponding to the data 1, another service process in the computing node 1 or a service process in another computing node may pull the metadata 1 from the metadata service device, to read the data 1 from the storage node 1.

In this embodiment of this application, a DPU is separately deployed on a computing node and a storage node, and a communication link is established between the DPU in the computing node and the DPU in the storage node. The DPU in the storage node synchronizes the memory address assignment information to the DPU in the computing node over the communication link, to enable the DPU in the computing node to pre-store a virtual memory address corresponding to a physical memory allocated by the storage node to the computing node. In this way, the computing node may implement remote direct memory mapping via the DPU, to implement direct access to the physical memory of the storage node. During specific implementation, the DPU in the computing node may allocate an available memory of the storage node to a service process in the computing node based on the memory address assignment information. For the service process, the service process only needs to interact with the DPU in the computing node to obtain the available memory, and may further write data into the available memory of the storage node by using the DPU in the computing node. Different service processes in the computing node do not need to respectively establish communication links to the storage node. Only one communication link needs to be established between a single computing node and storage nodes via a DPU. This solution greatly reduces a quantity of links between the computing node and the storage node, and can avoid a problem that memory overheads are excessively high due to an excessive quantity of links between the computing node and the storage node. Therefore, data transmission efficiency between the computing node and the storage node can be ensured, so that data processing efficiency can be improved, and data processing reliability and stability are improved.

Figure 8:
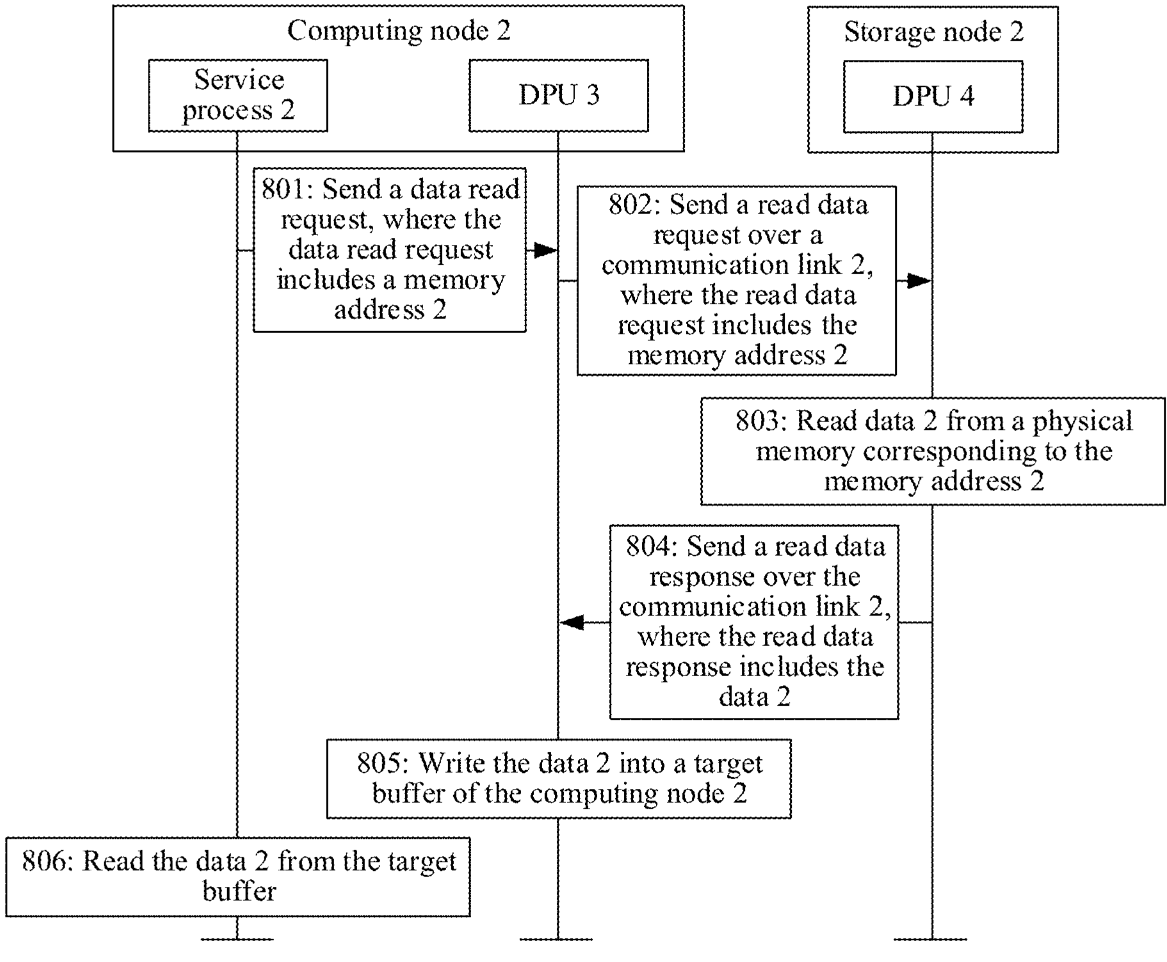
FIG. 8 is a schematic flowchart of another data processing method according to an embodiment of this application.

In another embodiment of this application, the implementation procedure in which a computing node reads data from a storage node is shown. For example, FIG. 8 is a schematic flowchart of another data processing method according to an embodiment of this application. The method may be applied to the data processing system shown in FIG. 5. A computing node 2 may be any computing node 510 in the data processing system shown in FIG. 5, and a storage node 2 may be any storage node 520 in the data processing system shown in FIG. 5. As shown in FIG. 8, the method includes the following steps.

Step 801: A service process 2 sends a data read request to a DPU 3, where the data read request includes a memory address 2.

The service process 2 is a service process running on the computing node 2. The service process 2 may be, for example, a reduce process. The memory address 2 is a virtual memory address corresponding to a physical memory of the storage node 2. The data read request is used for requesting to read data from the physical memory corresponding to the memory address 2. In this application, for ease of description, the data in the physical memory corresponding to the memory address 2 is referred to as data 2.

Optionally, the service process 2 obtains, from a metadata service device, metadata corresponding to to-be-read data. The metadata includes a memory address corresponding to a physical memory used for storing the to-be-read data. Then, the service process 2 may send, to the DPU 3, the data read request that carries a memory address corresponding to the to-be-read data. The service process 2 sends the data read request to the DPU 3, in other words, the service process 2 initiates a shuffle read procedure.

Step 802: The DPU 3 sends a read data request to a DPU 4 over a communication link 2, where the read data request includes the memory address 2.

The read data request is used for requesting the DPU 4 to read the data from the physical memory corresponding to the memory address 2.

Optionally, the read data request further includes a buffer address of a target buffer. In this case, the read data request is used for requesting the DPU 4 to write, into the target buffer, the data read from the physical memory corresponding to the memory address 2. The target buffer may be a cache of the DPU 3, and the cache may be accessed by the service process in the computing node 2. The target buffer may be a buffer allocated to the service process 2.

Step 803: The DPU 4 reads the data 2 from the physical memory corresponding to the memory address 2.

After receiving the read data request from the DPU 3 over the communication link 2, the DPU 4 determines, based on the memory address 2 carried in the read data request, a physical memory address corresponding to the memory address 2, and then reads data from the physical memory corresponding to the physical memory address.

Optionally, a storage in the storage node 2 includes an SSD, the DPU 4 is connected to the SSD through a memory access interface, and the memory access interface includes a buffer and a memory control chip. If the physical memory corresponding to the memory address 2 belongs to the SSD, an implementation process in which the DPU 4 reads the data 2 from the physical memory corresponding to the memory address 2 includes: The DPU 4 sends read data instructions to the memory control chip, where the read data instructions include the memory address 2. Then, the memory control chip reads the data 2 from physical space corresponding to the memory address 2 in the SSD, and writes the read data 2 into the buffer of the memory access interface. The DPU 4 reads the data 2 from the buffer. In this way, a DPU in a storage node may directly read data from the SSD through the memory access interface, without using an OS file system, so that disk access efficiency can be improved, thereby improving data processing efficiency.

Optionally, after reading the data from the physical memory corresponding to the memory address 2, the DPU 4 may perform the following step 804. If the DPU 4 does not read the data from the physical memory corresponding to the memory address 2, the DPU 4 may send a read data failure response to the DPU 3 over the communication link 2, to indicate that the data is not successfully read. Alternatively, the DPU 4 may not send, to the DPU 3, any response to the read data request. After the DPU 3 does not receive, over the communication link 2, a response to the read data request from the DPU 4 within specific duration after the read data request is sent, the DPU 3 independently determines that the data is not successfully read. After determining that the data is not successfully read, the DPU 3 may further send a data read failure response to the service process 2, to enable the service process 2 to perform data re-read.

Step 804: The DPU 4 sends a read data response to the DPU 3 over the communication link 2, where the read data response includes the data 2.

Optionally, when the read data request received by the DPU 4 carries the buffer address of the target buffer, the read data response sent by the DPU 4 for the read data request further includes the buffer address of the target buffer, and the read data response indicates the DPU 3 to write the data 2 into the target buffer.

Optionally, after receiving, from the DPU 4 over the communication link 2, the read data response that carries the data 2, the DPU 3 may perform the following step 805.

Step 805: The DPU 3 writes the data 2 into a target buffer of the computing node 2.

Optionally, the target buffer may be a buffer indicated by the buffer address carried in the read data response. Alternatively, the target buffer may be any buffer used for being accessed by the service process in the computing node 2, for example, may be the cache of the DPU 3.

Step 806: The service process 2 reads the data 2 from the target buffer.

In this embodiment of this application, a DPU is separately deployed on a computing node and a storage node, and a communication link is established between the DPU in the computing node and the DPU in the storage node. The computing node may implement remote direct memory mapping via the DPU, to implement direct access to a physical memory of the storage node. For a service process running on the computing node, when the service process needs to read data from the storage node, the service process only needs to pull the data from a corresponding memory of the storage node by using the DPU in the computing node. Different service processes in the computing node do not need to respectively establish communication links to the storage node. Only one communication link needs to be established between a single computing node and storage nodes via a DPU. This solution greatly reduces a quantity of links between the computing node and the storage node, and can avoid a problem that memory overheads are excessively high due to an excessive quantity of links between the computing node and the storage node. Therefore, data transmission efficiency between the computing node and the storage node can be ensured, so that data processing efficiency can be improved, and data processing reliability and stability are improved.

A sequence of steps of the data processing method provided in embodiments of this application can be properly adjusted, and the steps can also be correspondingly added or deleted based on a situation. Any varied method readily figured out by a person skilled in the art within the technical scope disclosed in this application shall fall within the protection scope of this application.

The following describes a virtual apparatus in embodiments of this application by using an example.

Figure 9:
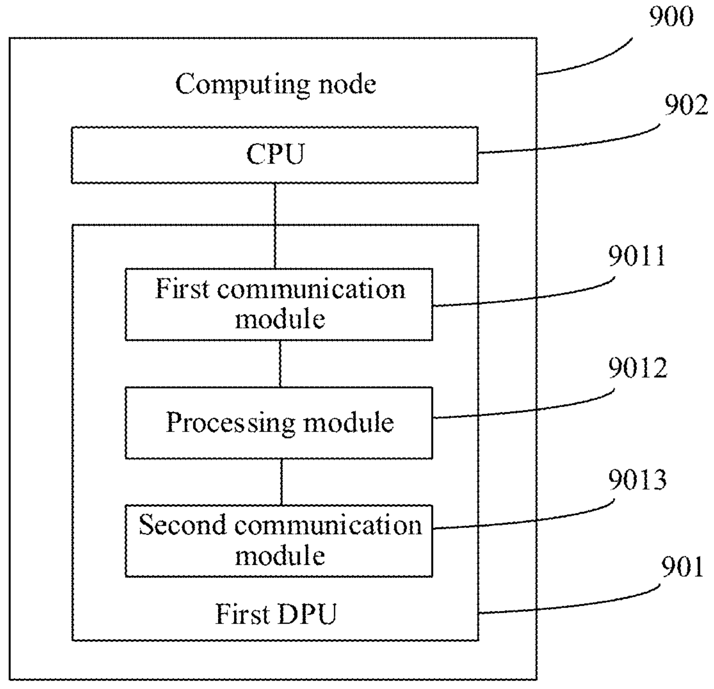
FIG. 9 is a diagram of a structure of a computing node according to an embodiment of this application.

FIG. 9 is a diagram of a structure of a computing node according to an embodiment of this application. As shown in FIG. 9, the computing node 900 includes a first DPU 901 and a CPU 902. A communication link is established between the first DPU 901 and a second DPU in a storage node. The first DPU 901 stores memory address assignment information. The memory address assignment information indicates a virtual memory address corresponding to a physical memory allocated by the storage node to the computing node. As shown in FIG. 9, the first DPU 901 includes a first communication module 9011, a processing module 9012, and a second communication module 9013.

The first communication module 9011 is configured to receive a memory allocation request from a first service process on the CPU.

The processing module 9012 is configured to determine, based on the memory address assignment information and in the virtual memory address corresponding to the physical memory allocated by the storage node to the computing node, a virtual memory address range assigned to the first service process.

The second communication module 9013 is configured to: when the first communication module receives a data storage request from the first service process, send a write data request to the second DPU over the communication link, where the data storage request includes first data and a first memory address, the first memory address belongs to the virtual memory address range, the write data request includes the first data and the first memory address, and the write data request is used for requesting the second DPU to write the first data into the physical memory corresponding to the first memory address.

Optionally, the first communication module 9011 is further configured to: when the second communication module 9013 receives a write data response from the second DPU over the communication link, and the write data response indicates that the first data is successfully written, send a data storage response to the first service process, where the data storage response indicates that the first data is successfully stored. The CPU 902 is configured to store, in a metadata service device through the first service process, first metadata corresponding to the first data, where the first metadata includes the first memory address.

Optionally, the second communication module 9013 is further configured to: when the first DPU 901 receives a data read request from a second service process on the CPU 902 by using the first communication module 9011, send a read data request to the second DPU over the communication link. The data read request includes a second memory address, and the second memory address is the virtual memory address corresponding to the physical memory of the storage node. The read data request includes the second memory address, and the read data request is used for requesting the second DPU to read second data from the physical memory corresponding to the second memory address.

Optionally, the processing module 9012 is further configured to: when the second communication module 9013 receives, from the second DPU over the communication link, a read data response that includes the second data, write the second data into a target buffer of the computing node. The CPU 902 is configured to read the second data from the target buffer through the second service process.

Optionally, the read data request further includes a buffer address of the target buffer, and the read data request is used for requesting the second DPU to write, into the target buffer, the data read from the physical memory corresponding to the second memory address. Correspondingly, the read data response further includes the buffer address of the target buffer, and the read data response indicates the first DPU to write the second data into the target buffer.

Optionally, the first service process is a map process, and the second service process is a reduce process.

Optionally, the second communication module 9013 is further configured to establish the communication link to the second DPU after the computing node is powered on. The second communication module 9013 is further configured to receive the memory address assignment information sent by the second DPU.

Optionally, the first DPU includes a first RDMA network interface card, and the second communication module 9013 is integrated into the first RDMA network interface card. The second DPU includes a second RDMA network interface card, and the communication link is an RDMA link established between the first RDMA network interface card and the second RDMA network interface card.

Figure 10:
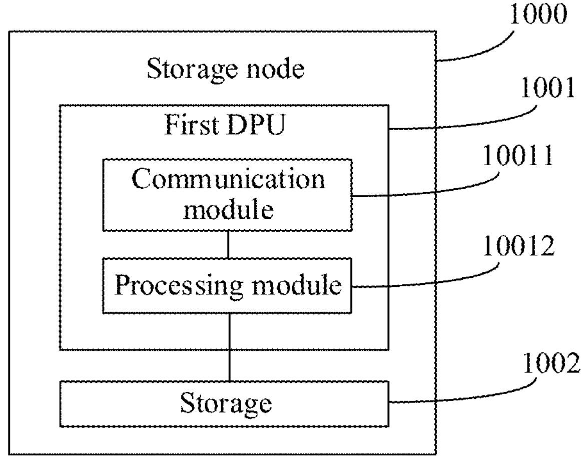
FIG. 10 is a diagram of a structure of a storage node according to an embodiment of this application.

FIG. 10 is a diagram of a structure of a storage node according to an embodiment of this application. As shown in FIG. 10, the storage node 1000 includes a first DPU 1001 and a storage 1002. A communication link is established between the first DPU 1001 and a second DPU in a computing node. As shown in FIG. 10, the first DPU 1001 includes a communication module 10011 and a processing module 10012.

The communication module 10011 is configured to receive a write data request from the second DPU over the communication link. The write data request includes first data and a first memory address. The first memory address is a virtual memory address corresponding to a physical memory that is allocated by the storage node to the computing node.

The processing module 10012 is configured to write the first data into the physical memory corresponding to the first memory address.

The communication module is further configured to send a write data response to the second DPU over the communication link. The write data response indicates that the first data is successfully written.

Optionally, the communication module 10011 is further configured to receive a read data request from the second DPU over the communication link. The read data request includes a second memory address. The second memory address is the virtual memory address corresponding to the physical memory of the storage node. The processing module 10012 is further configured to read second data from the physical memory corresponding to the second memory address. The communication module 10011 is further configured to send a read data response to the second DPU over the communication link. The read data response includes the second data.

Optionally, the read data request further includes a buffer address of a target buffer, and the read data request is used for requesting the first DPU to write, into the target buffer, the data read from the physical memory corresponding to the second memory address. The read data response further includes the buffer address of the target buffer, and the read data response indicates the second DPU to write the second data into the target buffer.

Optionally, the processing module 10012 is further configured to obtain the virtual memory address corresponding to the physical memory of the storage node. The communication module 10011 is further configured to send memory address assignment information to the second DPU after establishing the communication link to the second DPU. The memory address assignment information includes the virtual memory address corresponding to the physical memory allocated by the storage node to the computing node.

Optionally, the storage node 1000 includes a plurality of storages 1002. The processing module 10012 is configured to uniformly address the plurality of storages to obtain the virtual memory address corresponding to the physical memory of the storage node.

Optionally, the first DPU includes a first RDMA network interface card, and the communication module 10011 is integrated into the first RDMA network interface card. The second DPU includes a second RDMA network interface card, and the communication link is an RDMA link established between the first RDMA network interface card and the second RDMA network interface card.

Optionally, the storage 1002 includes a solid-state drive. The first DPU 1001 is connected to the solid-state drive through a memory access interface. The memory access interface includes a buffer and a memory control chip. The buffer is configured to store to-be-stored data written by the first DPU 1001 into the solid-state drive. The memory control chip is configured to write the to-be-stored data in the buffer into the solid-state drive. The memory control chip is further configured to write, into the buffer, to-be-read data read by the first DPU 1001 from the solid-state drive, to enable the first DPU 1001 to read the to-be-read data from the buffer.

Optionally, the memory access interface is integrated on the solid-state drive.

For the apparatus in the foregoing embodiments, specific manners of executing operations by each module are described in detail in embodiments related to the method, and details are not described herein.

The following describes a hardware structure in embodiments of this application by using an example.

Figures 11, 12:
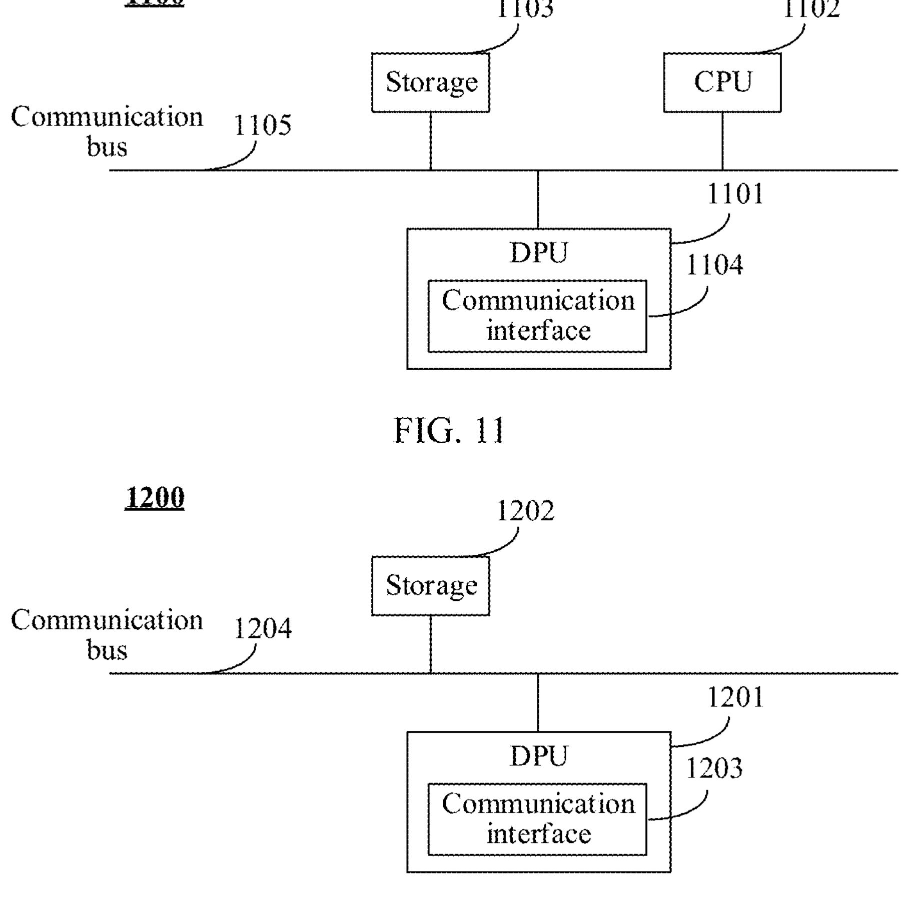
FIG. 11 is a block diagram of a computing node according to an embodiment of this application.
FIG. 12 is a block diagram of a storage node according to an embodiment of this application.

For example, FIG. 11 is a block diagram of a computing node according to an embodiment of this application. As shown in FIG. 11, the computing node 1100 includes a DPU 1101 and a CPU 1102. Optionally, the computing node 1100 further includes a storage 1103.

The storage 1103 is configured to store a computer program, where the computer program includes program instructions. Optionally, the storage 1103 may store an operating system and an application program unit that is required by at least one function. The operating system may be an operating system such as a real time executive (RTX), LINUX, UNIX, WINDOWS, or OS X.

The CPU 1102 is configured to invoke the computer program stored in the storage 1103, to run a service process. The service process may be the service process 1 in the method shown in FIG. 7 or the service process 2 in the method shown in FIG. 8. Optionally, the service process running on the CPU 1102 includes but is not limited to a map process and a reduce process. The CPU 1102 includes one or more processing cores, and the CPU 1102 executes various function applications and performs data processing by running the computer program.

The DPU 1101 is configured to invoke a computer program including program instructions, to implement actions performed by the DPU 1 in the method shown in FIG. 7 and/or the DPU 3 in the method shown in FIG. 8. The DPU 1101 includes a communication interface 1104. There may be a plurality of communication interfaces 1104, and the communication interface 1104 is configured to communicate with another device. For example, in this embodiment of this application, the communication interface 1104 is configured to communicate with a storage node or another computing node.

Optionally, the computing node 1100 further includes a communication bus 1105. The DPU 1101 is connected to the CPU 1102, and the CPU 1102 is connected to the storage 1103 by using the communication bus 1105.

For example, FIG. 12 is a block diagram of a storage node according to an embodiment of this application. As shown in FIG. 12, the storage node 1200 includes a DPU 1201 and a storage 1202.

The storage 1202 is configured to store data. Optionally, the storage 1202 includes but is not limited to a DRAM, a PCM, and an SSD.

The DPU 1201 is configured to invoke a computer program including program instructions, to implement actions performed by the DPU 2 in the method shown in FIG. 7 and/or the DPU 4 in the method shown in FIG. 8. The DPU 1201 includes a communication interface 1203. There may be a plurality of communication interfaces 1203, and the communication interface 1203 is configured to communicate with another device. For example, in this embodiment of this application, the communication interface 1203 is configured to communicate with one or more computing nodes.

Optionally, the storage node 1200 further includes a communication bus 1204. The DPU 1201 is connected to the storage 1202 by using the communication bus 1204.

The following describes a system structure in embodiments of this application.

Embodiments of this application provide a data processing system, including a computing node and a storage node. The computing node may be the computing node shown in FIG. 9 or FIG. 11. The storage node may be the storage node shown in FIG. 10 or FIG. 12. Optionally, the data processing system includes a computing node cluster and a storage node cluster. The computing node cluster includes one or more computing nodes, and the storage node cluster includes one or more storage nodes. For example, the data processing system may be shown in FIG. 5. The data processing system may be used in a remote shuffle architecture.

The computing node includes a first DPU and a CPU. The storage node includes a second DPU and a storage. A communication link is established between the first DPU and the second PDU. The first DPU stores memory address assignment information. The memory address assignment information indicates a virtual memory address corresponding to a physical memory allocated by the storage node to the computing node. The physical memory of the storage node belongs to the storage.

In a process (shuffle write process) in which the computing node writes data into the storage node, the CPU is configured to send a memory allocation request from a first service process to the first DPU. The first service process is any map process running on the CPU. The first DPU is configured to determine, based on the memory address assignment information and in the virtual memory address corresponding to the physical memory allocated by the storage node to the computing node, a virtual memory address range assigned to the first service process. The CPU is further configured to send a data storage request from the first service process to the first DPU. The data storage request includes first data and a first memory address. The first memory address belongs to the virtual memory address range assigned by the first DPU to the first service process. The first DPU is configured to send a write data request to the second DPU over the communication link between the first DPU and the second PDU. The write data request includes the first data and the first memory address. The second DPU is configured to write the first data into the physical memory corresponding to the first memory address. The second DPU is further configured to send a write data response to the first DPU over the communication link between the first DPU and the second PDU. The write data response indicates that the first data is successfully written.

In a process (shuffle read process) in which the computing node reads data from the storage node, the CPU is configured to send a data read request from a second service process to the first DPU. The data read request includes a second memory address. The second memory address is the virtual memory address corresponding to the physical memory of the storage node. The second service process is any reduce process running on the CPU. The first DPU is configured to send a read data request to the second DPU over the communication link between the first DPU and the second PDU. The read data request includes the second memory address. The second DPU is configured to read second data from the physical memory corresponding to the second memory address. The second DPU is further configured to send a read data response to the first DPU over the communication link between the first DPU and the second PDU. The read data response includes the second data.

Embodiments of this application further provide a computer-readable storage medium. The computer-readable storage medium stores instructions; and when the instructions are executed by a processor, actions performed by the computing node or actions performed by the storage node in the foregoing method embodiments are implemented.

Embodiments of this application further provide a computer program product, including a computer program; and when the computer program is executed by a processor, actions performed by the computing node or actions performed by the storage node in the foregoing method embodiments are implemented.

A person of ordinary skill in the art may understand that all or some of the steps of the embodiments may be implemented by hardware or a program instructing related hardware. The program may be stored in a computer-readable storage medium. The storage medium mentioned above may be a read-only memory, a magnetic disk, an optical disc, or the like.

In embodiments of this application, the terms "first", "second", and "third" are merely used for description, but cannot be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that information (including but not limited to user equipment information, personal information of a user, and the like), data (including but not limited to data used for analysis, stored data, displayed data, and the like), and signals in this application are used under authorization by the user or full authorization by all parties, and capturing, use, and processing of related data need to conform to related laws, regulations, and standards of related countries and regions. For example, the memory address assignment information, the first data, and the second data in this application are all obtained under full authorization.

The foregoing descriptions are merely optional embodiments of this application, but are not intended to limit this application. Any modification, equivalent replacement, improvement, or the like made within the concept and principle of this application shall fall within the protection scope of this application.

The invention claimed is:

1. A data processing method, comprising:

receiving, by a first data processing unit (DPU), a memory allocation request from a first service process in a computing node that comprises the first DPU, wherein the first DPU stores memory address assignment information that indicates a virtual memory address corresponding to a physical memory allocated by a storage node to the computing node, and wherein a communication link is established between the first DPU and a second DPU in the storage node after the computing node is powered on;

receiving, by the first DPU, the memory address assignment information sent by the second DPU over the communication link;

determining, by the first DPU based on the memory address assignment information and in the virtual memory address corresponding to the physical memory allocated by the storage node to the computing node, a virtual memory address range assigned to the first service process; and when the first DPU receives a data storage request from the first service process, sending, by the first DPU, a write data request to the second DPU over the communication link, wherein the data storage request comprises first data and a first memory address, the first memory address belongs to the virtual memory address range, the write data request comprises the first data and the first memory address, and the write data request is used for requesting the second DPU to write the first data into the physical memory corresponding to the first memory address.

2. The method according to claim 1, wherein after the sending, by the first DPU, a write data request to the second DPU over the communication link, the method further comprises:

in response to determining the first DPU receives a write data response from the second DPU over the communication link and the write data response indicates that the first data is successfully written, sending, by the first DPU, a data storage response to the first service process, wherein the data storage response indicates that the first data is successfully stored; and storing, by the first service process in a metadata service device, first metadata corresponding to the first data, wherein the first metadata comprises the first memory address.

3. The method according to claim 1, wherein the method further comprises:

when the first DPU receives a data read request from a second service process in the computing node, sending, by the first DPU, a read data request to the second DPU over the communication link, wherein the data read request comprises a second memory address, the second memory address is the virtual memory address corresponding to the physical memory of the storage node, the read data request comprises the second memory address, and the read data request is used for requesting the second DPU to read second data from the physical memory corresponding to the second memory address.

4. The method according to claim 3, wherein after the sending, by the first DPU, a read data request to the second DPU over the communication link, the method further comprises:

when the first DPU receives, from the second DPU over the communication link, a read data response that comprises the second data, writing, by the first DPU, the second data into a target buffer of the computing node; and reading, by the second service process, the second data from the target buffer.

5. The method according to claim 4, wherein the read data request further comprises a buffer address of the target buffer, and the read data request is used for requesting the second DPU to write, into the target buffer, the data read from the physical memory corresponding to the second memory address; and the read data response further comprises the buffer address of the target buffer, and the read data response indicates the first DPU to write the second data into the target buffer.

6. The method according to claim 3, wherein the first service process is a map process, and the second service process is a reduce process.

7. The method according to claim 1, wherein the first DPU comprises a first remote direct memory access (RDMA) network interface card, the second DPU comprises a second RDMA network interface card, and the communication link is an RDMA link established between the first RDMA network interface card and the second RDMA network interface card.

8. A computing node, comprising a first data processing unit (DPU), first DPU stores memory address assignment information that indicates a virtual memory address corresponding to a physical memory allocated by a storage node to the computing node, wherein a communication link is established between the first DPU and a second DPU in the storage node, and wherein the first DPU is configured to:

receive, a memory allocation request from a first service process in the computing node after the computing node is powered on;

receive, by the first DPU, the memory address assignment information sent by the second DPU over the communication link;

determine, based on the memory address assignment information and in the virtual memory address corresponding to the physical memory allocated by the storage node to the computing node, a virtual memory address range assigned to the first service process; and when the first DPU receives a data storage request from the first service process, send a write data request to the second DPU over the communication link, wherein the data storage request comprises first data and a first memory address, the first memory address belongs to the virtual memory address range, the write data request comprises the first data and the first memory address, and the write data request is used for requesting the second DPU to write the first data into the physical memory corresponding to the first memory address.

9. The computing node according to claim 8, wherein the first DPU is further configured to: in response to receiving a write data response from the second DPU over the communication link, and the write data response indicates that the first data is successfully written, send a data storage response to the first service process, wherein the data storage response indicates that the first data is successfully stored; and a CPU of the computing node is configured to store, in a metadata service device through the first service process, first metadata corresponding to the first data, wherein the first metadata comprises the first memory address.

10. The computing node according to claim 8, wherein the first DPU is further configured to: in response to receiving a data read request from a second service process on a central processing unit (CPU), send a read data request to the second DPU over the communication link, wherein the data read request comprises a second memory address, the second memory address is the virtual memory address corresponding to the physical memory of the storage node, the read data request comprises the second memory address, and the read data request is used for requesting the second DPU to read second data from the physical memory corresponding to the second memory address.

11. The computing node according to claim 10, wherein the first DPU is further configured to: in response to receiving, from the second DPU over the communication link, a read data response that comprises the second data, write the second data into a target buffer of the computing node; and the CPU of the computing node is configured to read the second data from the target buffer through the second service process.

12. A data processing system, comprising a computing node and a storage node, wherein the computing node comprises a first data processing unit (DPU) and a central processing unit (CPU), the storage node comprises a second DPU and a storage, a communication link is established between the first DPU and the second DPU, the first DPU stores memory address assignment information that indicates a virtual memory address corresponding to a physical memory in the storage allocated by the storage node to the computing node;

the CPU is configured to send a memory allocation request from a first service process to the first DPU, wherein the first service process is a map process running on the CPU after the computing node is powered on;

the first DPU is configured to;

receive the memory address assignment information sent by the second DPU over the communication link; and determine, based on the memory address assignment information and in the virtual memory address corresponding to the physical memory allocated by the storage node to the computing node, a virtual memory address range assigned to the first service process;

the CPU is further configured to send a data storage request from the first service process to the first DPU, wherein the data storage request comprises first data and a first memory address, and the first memory address belongs to the virtual memory address range;

the first DPU is configured to send a write data request to the second DPU over the communication link, wherein the write data request comprises the first data and the first memory address;

the second DPU is configured to write the first data into the physical memory corresponding to the first memory address; and the second DPU is further configured to send a write data response to the first DPU over the communication link, wherein the write data response indicates that the first data is successfully written.

13. The system according to claim 12, wherein the CPU is further configured to send a data read request from a second service process to the first DPU, wherein the data read request comprises a second memory address, the second memory address is the virtual memory address corresponding to the physical memory of the storage node, and the second service process is any reduce process running on the CPU;

the first DPU is configured to send a read data request to the second DPU over the communication link, wherein the read data request comprises the second memory address;

the second DPU is configured to read second data from the physical memory corresponding to the second memory address; and the second DPU is further configured to send a read data response to the first DPU over the communication link, wherein the read data response comprises the second data.

14. The system according to claim 12, wherein the first DPU is further configured to: in response to receiving a write data response from the second DPU over the communication link, and the write data response indicates that the first data is successfully written, send a data storage response to the first service process, wherein the data storage response indicates that the first data is successfully stored; and the CPU of the computing node is configured to store, in a metadata service device through the first service process, first metadata corresponding to the first data, wherein the first metadata comprises the first memory address.

15. The system according to claim 12, wherein the first DPU is further configured to: in response to receiving a data read request from a second service process on the CPU, send a read data request to the second DPU over the communication link, wherein the data read request comprises a second memory address, the second memory address is the virtual memory address corresponding to the physical memory of the storage node, the read data request comprises the second memory address, and the read data request is used for requesting the second DPU to read second data from the physical memory corresponding to the second memory address.

16. The system according to claim 15, wherein the first DPU is further configured to: in response to receiving, from the second DPU over the communication link, a read data response that comprises the second data, write the second data into a target buffer of the computing node; and the CPU is configured to read the second data from the target buffer through a second service process.

17. The system according to claim 12, wherein the storage node is further configured to:

obtain the virtual memory address corresponding to the physical memory of the storage node; and send memory address assignment information to the second DPU after establishing the communication link to the second DPU, wherein the memory address assignment information comprises the virtual memory address corresponding to the physical memory allocated by the storage node to the computing node.

* * * * *